(12) United States Patent
Hong et al.

(10) Patent No.: US 8,947,625 B2
(45) Date of Patent: Feb. 3, 2015

(54) THIN FILM TRANSISTOR ARRAY PANEL AND LIQUID CRYSTAL DISPLAY DEVICE INCLUDING THE SAME

(75) Inventors: Seung-Ho Hong, Gunpo-si (KR); Hyeok-Jin Lee, Seongnam-si (KR); Soon-Joon Rho, Suwon-si (KR); Yong-Woon Lim, Seoul (KR); Suk Choi, Seongnam-si (KR); Oh-Jeong Kwon, Hwaseong-si (KR); Kyung-Hye Park, Seongnam-si (KR); Su-Jin Kim, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 101 days.

(21) Appl. No.: 13/414,472

(22) Filed: Mar. 7, 2012

(65) Prior Publication Data
US 2012/0236244 A1    Sep. 20, 2012

(30) Foreign Application Priority Data
Mar. 14, 2011    (KR) ........................ 10-2011-0022388

(51) Int. Cl.
| G02F 1/1343 | (2006.01) |
| G02F 1/1337 | (2006.01) |
| G02F 1/1362 | (2006.01) |
| G02F 1/137 | (2006.01) |

(52) U.S. Cl.
CPC .... *G02F 1/134363* (2013.01); *G02F 1/133707* (2013.01); *G02F 1/13624* (2013.01); *G02F 2001/134381* (2013.01); *G02F 2201/122* (2013.01); *G02F 2201/128* (2013.01); *G02F 2001/133742* (2013.01); *G02F 2001/13629* (2013.01); *G02F 2001/13706* (2013.01); *G02F 2201/123* (2013.01)
USPC .......................................... 349/141; 349/48

(58) Field of Classification Search
CPC .................................................. G02F 1/133707
USPC ......................................................... 349/141
See application file for complete search history.

(56) References Cited

U.S. PATENT DOCUMENTS

| 6,642,984 | B1 * | 11/2003 | Yoshida et al. ............... 349/139 |
| 6,897,931 | B2 * | 5/2005 | Lee et al. ...................... 349/141 |
| 7,304,706 | B2 | 12/2007 | Mizoguchi |
| 7,411,647 | B2 * | 8/2008 | Ono et al. ..................... 349/141 |
| 2004/0109119 | A1 * | 6/2004 | Lee ................................ 349/141 |
| 2006/0187368 | A1 * | 8/2006 | Kim et al. ....................... 349/38 |
| 2008/0079885 | A1 * | 4/2008 | Lee et al. ..................... 349/144 |
| 2010/0053484 | A1 * | 3/2010 | Ono ............................... 349/37 |

FOREIGN PATENT DOCUMENTS

| JP | 11-194353 | 7/1999 |
| JP | 2002-040456 | 2/2002 |

(Continued)

*Primary Examiner* — Michael Caley
*Assistant Examiner* — Edmond Lau
(74) *Attorney, Agent, or Firm* — H.C. Park & Associates, PLC

(57) ABSTRACT

The present invention provides a panel capable of driving a liquid crystal in stable manner and improving response speed of the liquid crystal of a liquid crystal display, and the panel according to the present invention may include: a substrate; a first pixel electrode and a second pixel electrode disposed facing each other on the substrate; and a branch electrode extending from at least one of the first pixel electrode and the second pixel electrode.

21 Claims, 12 Drawing Sheets

(56) References Cited

FOREIGN PATENT DOCUMENTS

| JP | 2005-128324 | 5/2005 |
|---|---|---|
| JP | 2007-316321 | 12/2007 |
| JP | 2008-281799 | 11/2008 |
| KR | 10-0323365 | 1/2002 |
| KR | 10-0458172 | 11/2004 |
| KR | 10-0593315 | 6/2006 |
| KR | 10-2006-0100090 | 9/2006 |
| KR | 10-2007-0014703 | 2/2007 |
| KR | 10-0718759 | 5/2007 |
| KR | 10-2008-0076444 | 8/2008 |
| KR | 10-2008-0105602 | 12/2008 |
| KR | 10-2009-0116856 | 11/2009 |
| KR | 10-2009-0126466 | 12/2009 |

* cited by examiner

THIN FILM TRANSISTOR ARRAY PANEL AND LIQUID CRYSTAL DISPLAY DEVICE INCLUDING THE SAME

CROSS-REFERENCE TO RELATED APPLICATION

This application claims priority to and the benefit of Korean Patent Application No. 10-2011-0022388, filed on Mar. 14, 2011, which is incorporated by reference for all purposes as if fully set forth herein.

BACKGROUND OF THE INVENTION

1. Field of the Invention

Exemplary embodiments of the present invention relate to a liquid crystal display using thin film transistor technology. More particularly, the present invention relates to a thin film transistor array panel capable of driving a liquid crystal in a stable manner and improving response speed of the liquid crystal.

2. Description of the Background

A liquid crystal display has been adopted as one of the most widely used flat panel displays.

To achieve high contrast ration and wide reference viewing angle, a vertical alignment (VA) mode LCD has been introduced.

In the vertical alignment (VA) mode liquid crystal display, however, when two electrodes applied with different voltages are disposed with the same substrate in one pixel, the liquid crystal may unstably be driven at the center between the two electrodes.

Therefore, there is a need to stably drive a liquid crystal and to improve response speed of the liquid crystal.

SUMMARY OF THE INVENTION

These and other needs are addressed by the present invention, in which exemplary embodiments of the present invention provide a thin film transistor array panel that stably drives a liquid crystal of a liquid crystal display.

Also, a thin film transistor array panel is provided to minimize a reduction of transmittance while improving response speed of the liquid crystal of a liquid crystal display.

Exemplary embodiments of the present invention disclose an apparatus. The apparatus includes a substrate. The apparatus also includes a first pixel electrode and a second pixel electrode disposed to face each other on the substrate. The apparatus includes a branch electrode extending from at least one of the first pixel electrode and the second pixel electrode.

Exemplary embodiments of the present invention disclose a liquid crystal display. The liquid crystal display includes a first substrate and a second substrate facing each other. The display includes a gate line disposed on the first substrate. The display includes a voltage transmitting line disposed on the first substrate and a data line disposed on the first substrate and transmitting a data signal. The display includes a first thin film transistor connected to the gate line and the voltage transmitting line, a second thin film transistor connected to the gate line and the data line and a first pixel electrode connected to the first thin film transistor. The display includes a second pixel electrode connected to the second thin film transistor and facing the first pixel electrode. The display includes a branch electrode extending from at least one of the first pixel electrode, the second pixel electrode or both the first pixel electrode and the second pixel electrode. And the display also includes a liquid crystal layer disposed between the first substrate and the second substrate, having positive dielectric anisotropy, and being aligned vertically.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE EMBODIMENTS

Figure 1:
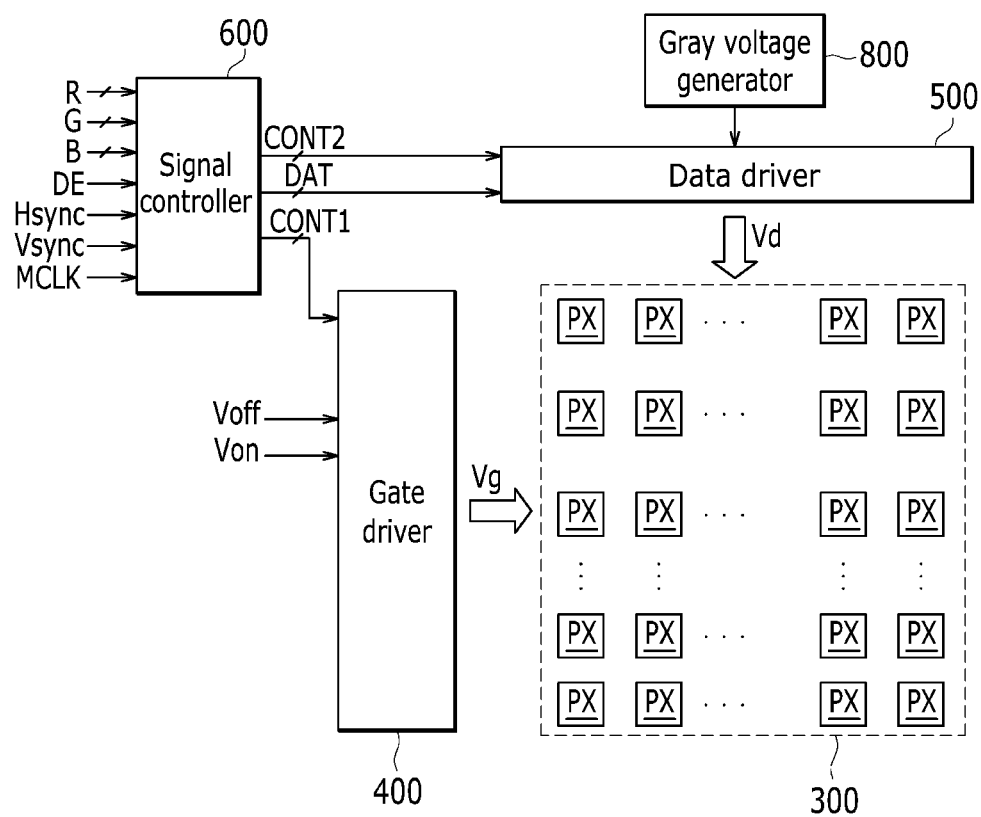
FIG. 1 is a block diagram of a liquid crystal display according to exemplary embodiments of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

In the drawings, thickness of layers, films, panels, and regions may be exaggerated for clarity. Like reference numerals designate like elements throughout the specification. It is understood that when an element such as a layer, film, region, or substrate is referred to as being "on" another element, it can be directly on the other element or intervening elements may also be present. In contrast, when an element is referred to as being "directly on" another element, there are no intervening elements present.

A liquid crystal display according to exemplary embodiments of the present invention is described with reference to FIG. 1 and FIG. 2.

Figure 2:
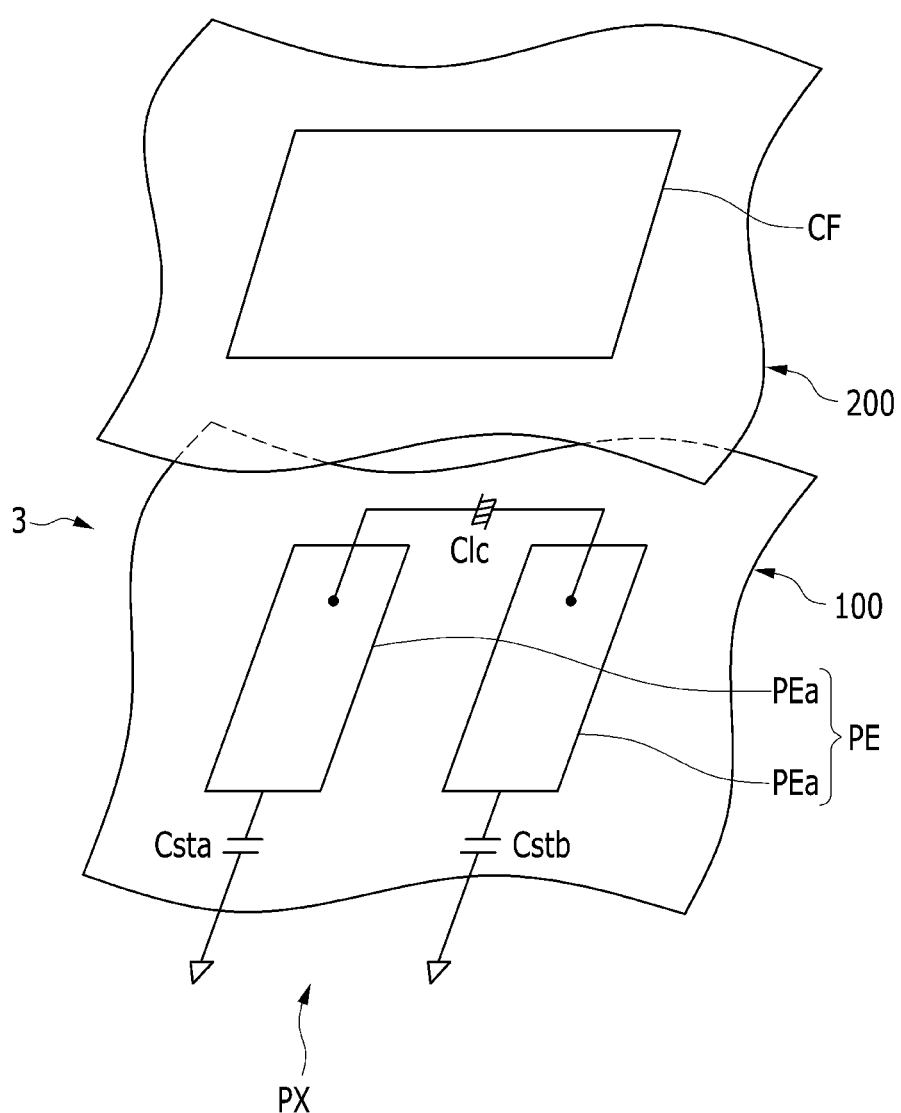
FIG. 2 is a circuit diagram showing one pixel in addition to the structure of a liquid crystal display according to exemplary embodiments of the present invention.

FIG. 1 is a block diagram of a liquid crystal display according to exemplary embodiments of the present invention, and FIG. 2 is a circuit diagram showing one pixel in addition to the structure of a liquid crystal display according to exemplary embodiments of the present invention.

Referring to FIG. 1, a liquid crystal display according to exemplary embodiments of the present invention may include a liquid crystal panel assembly 300, a gate driver 400, a data driver 500, a gray voltage generator 800, and a signal controller 600.

For example, the liquid crystal panel assembly 300 may include a plurality of signal lines (not shown) and a plurality of pixels PX connected thereto and arranged in an approximate matrix format. In a viewpoint of a structure shown in FIG. 2, the liquid crystal panel assembly 300 may include a lower panel 100 and an upper panel 200 facing each other, and a liquid crystal layer 3 interposed therebetween.

A plurality of signal lines include a plurality of gate lines transmitting gate signals (referred to as "scanning signals"), a plurality of pairs of data lines transmitting data voltages, and a voltage transmitting line transmitting a constant voltage or a swing voltage. The gate lines may be arranged in parallel to each other and extend approximately in a row direction, and the data lines and the voltage transmitting line may be arranged in parallel to each other and extend approximately in a column direction.

Referring to FIG. 2, each pixel PX includes a liquid crystal capacitor Clc, and the liquid crystal capacitor Clc includes a first pixel electrode PEa and a second pixel electrode PEb of the lower panel 100 as two terminals and the liquid crystal layer 3 between the first pixel electrode PEa and the second pixel electrode PEb as a dielectric material.

The liquid crystal layer 3 has dielectric anisotropy, and liquid crystal molecules 31 of the liquid crystal layer 3 may be arranged such that their long axes are aligned perpendicular to surfaces of the two panels 100 and 200 when an electric field is not applied.

The first pixel electrode PEa and the second pixel electrode PEb included in a pixel electrode PE may be disposed on different layers or on the same layer.

First storage capacitor Csta and second storage capacitor Cstb serving as assistants of the liquid crystal capacitor Clc may be formed by superimposing separate electrodes (not shown) provided on the lower panel 100 while being interposed between the first pixel electrode PEa and the second pixel electrode PEb, and insulators.

Meanwhile, in order to realize color display, each pixel PX uniquely displays one of primary colors (spatial division), or each pixel PX temporally and alternately displays primary colors (temporal division). Then, the primary colors are spatially or temporally synthesized, and thus a desired color is recognized. Examples of the primary colors may include, for example, three primary colors of red, green, and blue, or yellow, cyan, and magenta. Also, each pixel may display a mixture color of the primary colors, or white. One example of the spatial division is represented in FIG. 2, where each pixel PX is provided with a color filter CF indicating one of the primary colors on the region of the upper panel 200 corresponding to the first pixel electrode PEa and second pixel electrode PEb. Unlike FIG. 2, the color filter CF may be disposed on or below the first pixel electrode PEa and second pixel electrode PEb of the lower panel 100.

At least one polarizer (not shown) for providing light polarization may be provided in the liquid crystal panel assembly 300.

Next, a driving method of a liquid crystal display according to exemplary embodiments of the present invention will be described with reference to FIG. 3 as well as FIG. 1 and FIG. 2.

Figure 3:
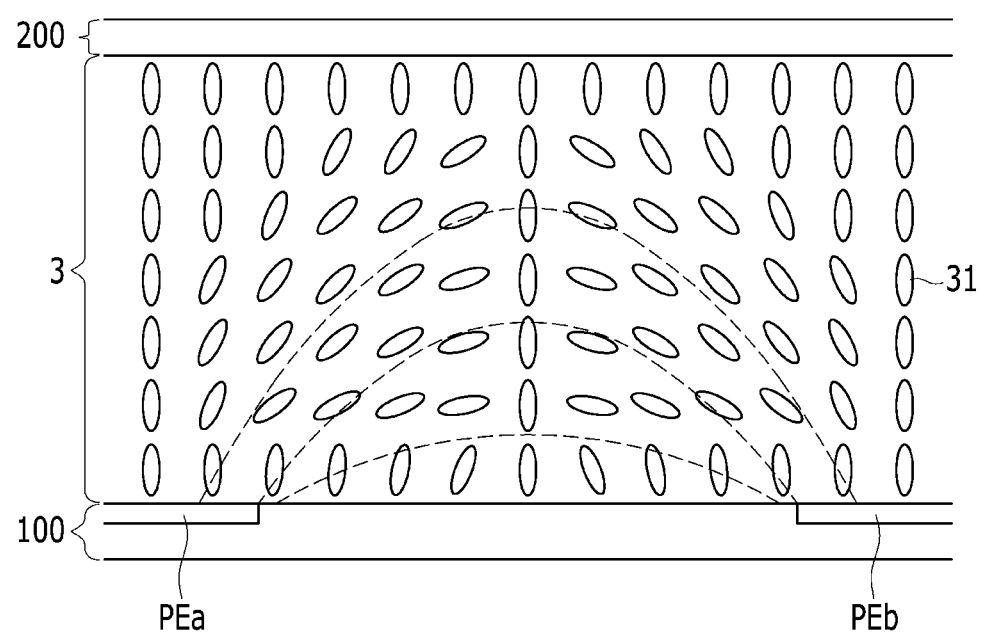
FIG. 3 is a schematic cross-sectional view of a liquid crystal display according to exemplary embodiments of the present invention.

FIG. 3 is a schematic cross-sectional view of a liquid crystal display according to exemplary embodiments of the present invention.

Referring to FIG. 3, one of the first pixel electrode PEa and the second pixel electrode PEb may be applied with a data voltage, and the other electrodes (not shown) may be applied with a predetermined voltage or two voltages that are swung.

The difference between the two data voltages applied to the first pixel electrode PEa and the second pixel electrode PEb is expressed as a charged voltage of the liquid crystal capacitors Clc, i.e., a pixel voltage. If a potential difference is generated between two terminals of the liquid crystal capacitor Clc, as shown in FIG. 3, an electric field parallel to the surface of the display panel 100 and 200 is formed on the liquid crystal layer 3 between the first pixel electrode PEa and the second pixel electrode PEb.

When the liquid crystal molecules 31 have positive dielectric anisotropy, the liquid crystal molecules 31 are arranged such that the long axes thereof are aligned parallel to the direction of the electric field, and the degree of inclination may be changed according to the magnitude of the pixel voltage. This liquid crystal layer 3 is referred to as an electrically-induced optical compensation (EOC) mode liquid crystal layer. Also, the change degree of the polarization of light passing through the liquid crystal layer 3 may be changed according to the inclination degree of the liquid crystal molecules 31. The change of the polarization appears as a change of transmittance of the light by the polarizer, and accordingly, the pixel PX can display a desired predetermined luminance.

Next, a liquid crystal display according to exemplary embodiments of the present invention will be described with reference to accompanying drawings.

Figure 4:
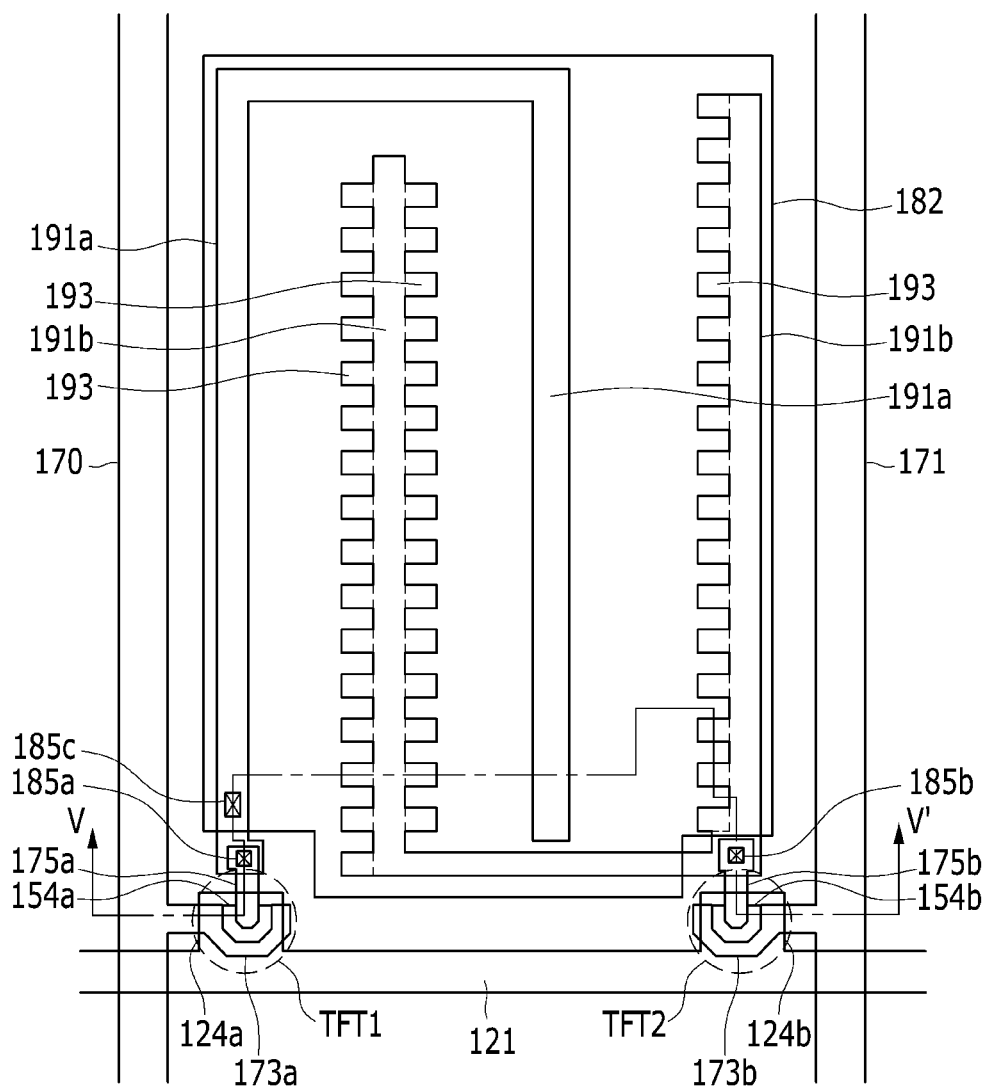
FIG. 4 is a layout view of one pixel of a liquid crystal display according to exemplary embodiments of the present invention.
Figure 5:
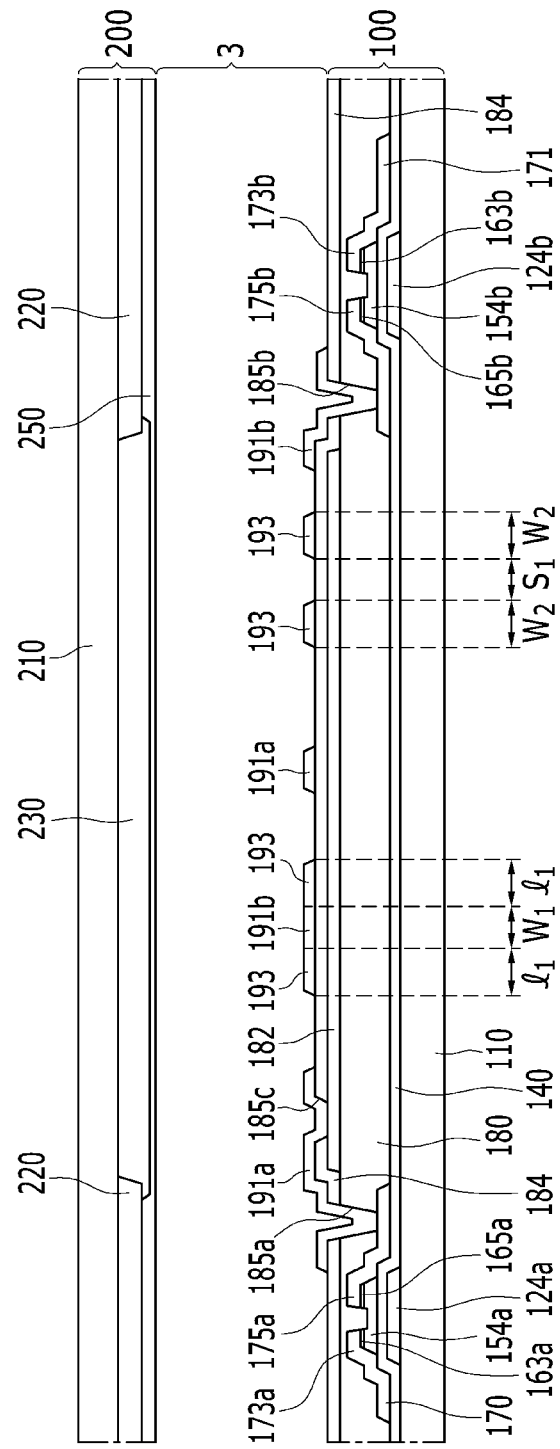
FIG. 5 is a cross-sectional view of one pixel of a liquid crystal display taken along the line V-V' of FIG. 4.

For example, FIG. 4 is a layout view of one pixel of a liquid crystal display according to exemplary embodiments of the present invention, and FIG. 5 is a cross-sectional view of one pixel of a liquid crystal display taken along the line V-V' of FIG. 4.

As an example, the liquid crystal panel assembly of FIGS. 4 and 5 may include the lower panel 100 and the upper panel 200 facing each other, and the liquid crystal layer 3 interposed between the two display panels 100 and 200.

The lower panel 100 may include a first substrate 110 made of glass or plastic, a gate line 121 disposed in one direction on the first substrate 110, a voltage transmitting line 170 and a data line 171 intersecting the gate line 121, a first thin film transistor TFT1 connected to the gate line 121 and the voltage transmitting line 170, a second thin film transistor TFT2 connected to the gate line 121 and the data line 171, a first pixel electrode 191a connected to the first thin film transistor TFT1, and a second pixel electrode 191b connected to the second thin film transistor TFT2.

The gate line 121 transmits a gate signal and may extend substantially in a transverse direction. A first gate electrode 124a and a second gate electrode 124b protruded from the gate line 121 are disposed on the first substrate 110, and thereby the gate signal is transmitted to the first gate electrode 124a and the second gate electrode 124b through the gate line 121.

Although not shown, a storage electrode line and a storage electrode protruded from the storage electrode line may be further formed with the same layer as the gate line 121.

For example, a gate insulating layer 140 is disposed on the whole surface of the first substrate 110 including the gate line 121, the first gate electrode 124*a*, and the second gate electrode 124*b*. The gate insulating layer 140 may be made of silicon nitride (SiNx) or silicon oxide (SiOx).

A first semiconductor 154*a* and a second semiconductor 154*b* that are made of hydrogenated amorphous silicon or polysilicon are disposed on the gate insulating layer 140. The first semiconductor 154*a* and the second semiconductor 154*b* are respectively positioned on the first gate electrode 124*a* and the second gate electrode 124*b*.

A pair of first ohmic contacts 163*a* and 165*a* is disposed on the first semiconductor 154*a*, and a pair of second ohmic contacts 163*b* and 165*b* is disposed on the second semiconductor 154*b*. The second ohmic contacts 163*b* and 165*b* may be made of a material such as n+ hydrogenated amorphous silicon, which is highly doped with an n-type impurity such as phosphorous (P), or of silicide.

The voltage transmitting line 170 transmits a voltage of a predetermined magnitude or voltages that are swung and extends substantially in the longitudinal direction, thereby intersecting the gate line 121. The data line 171 transmits the data signal and extends parallel to the voltage transmitting line 170, thereby intersecting the gate line 121.

Although not shown, the liquid crystal display according to exemplary embodiments of the present invention may include a plurality of pixels, and the voltage transmitting line 170 may be disposed one by one for at least three pixels that are disposed adjacent to each other in a pixel row direction. Here, first source electrodes 173*a* of at least two pixels among the three pixels are connected to the voltage transmitting line 170 through a connection member (not shown), thereby receiving a signal from the voltage transmitting line 170. Accordingly, one voltage transmitting line 170 may transmit the voltage to at least three pixel rows.

A first source electrode 173*a* protruded from the voltage transmitting line 170 and a first drain electrode 175*a* separated from the first source electrode 173*a* are disposed on the first ohmic contacts 163*a* and 165*a*. Here, the first source electrode 173*a* may be formed with a "U" shape. Also, the first semiconductor 154*a* may be disposed under the voltage transmitting line 170 as well as the first source electrode 173*a* and the first drain electrode 175*a*.

A second source electrode 173*b* protruded from the data line 171 and a second drain electrode 175*b* separated from the second source electrode 173*b* are disposed on the second ohmic contacts 163*b* and 165*b*. Here, the second source electrode 173*b* may be formed with the "U" shape. Also, the second semiconductor 154*b* may be disposed under the data line 171 as well as the second source electrode 173*b* and the second drain electrode 175*b*.

The first gate electrode 124*a*, the first source electrode 173*a*, and the first drain electrode 175*a* form a first thin film transistor TFT1 along with the first semiconductor 154*a*, and the channel of the first thin film transistor TFT1 is disposed in the first semiconductor 154*a* between the first source electrode 173*a* and the first drain electrode 175*a*.

The second gate electrode 124*b*, the second source electrode 173*b*, and the second drain electrode 175*b* form a second thin film transistor TFT2 along with the second semiconductor 154*b*, and the channel of the second thin film transistor is disposed in the second semiconductor 154*b* between the second source electrode 173*b* and the second drain electrode 175*b*.

A first passivation layer 180 is disposed on the whole surface of the first substrate 110 including the first thin film transistor TFT1 and the second thin film transistor TFT2. The first passivation layer 180 may be made of an inorganic insulating material or an organic insulating material.

A dummy electrode 182 is disposed on the first passivation layer 180. The gate line 121 and the voltage transmitting line 170 and data line 171 that intersect each other may define a plurality of pixel areas, and the dummy electrode 182 may be wholly disposed in one pixel area.

A second passivation layer 184 is disposed on the whole surface of the first substrate 110 including the dummy electrode 182. The second passivation layer 184 may be made of the inorganic insulating material or the organic insulating material.

The first passivation layer 180 and the second passivation layer 184 have a first contact hole 185*a* exposing a portion of the first drain electrode 175*a* and a second contact hole 185*b* exposing a portion of the second drain electrode 175*b*. Also, the second passivation layer 184 has a third contact hole 185*c* exposing a portion of the dummy electrode 182.

The first pixel electrode 191*a* connected to the first drain electrode 175*a* through the first contact hole 185*a* and the second pixel electrode 191*b* connected to the second drain electrode 175*b* through the second contact hole 185*b* are disposed on the second passivation layer 184. The first pixel electrode 191*a* is connected to the dummy electrode 182 through the third contact hole 185*c*. The first pixel electrodes 191*a* and the second pixel electrode 191*b* may be formed of a transparent material, for example, indium tin oxide (ITO) or indium zinc oxide (IZO), or a reflective metal such as aluminum, silver, chromium, or alloys thereof.

The first pixel electrode 191*a* is electrically connected to the first drain electrode 175*a*, thereby receiving a voltage transmitted by the voltage transmitting line 170. Also, the second pixel electrode 191*b* is electrically connected to the second drain electrode 175*b*, thereby receiving the voltage transmitted by the data line 171. The first pixel electrode 191*a* and the second pixel electrode 191*b* form the liquid crystal capacitor Clc along with the liquid crystal layer 3 such that the applied voltage is maintained after the first thin film transistor TFT1 and the second thin film transistor TFT2 are turned off.

The first pixel electrode 191*a* and the second pixel electrode 191*b* face each other with a long bar shape. The first pixel electrode 191*a* and the second pixel electrode 191*b* may be formed in plural in one pixel area, and the first pixel electrode 191*a* and the second pixel electrode 191*b* are alternately disposed. In FIG. 3, the first pixel electrode 191*a* and the second pixel electrode 191*b* are formed two by two and alternately disposed, two first pixel electrodes 191*a* are connected to each other, and two second pixel electrodes 191*b* are connected to each other. The number of the first pixel electrode 191*a* and the second pixel electrode 191*b* disposed in one pixel area may be appropriately selected when considering the size of the pixel area, the width of the first and second pixel electrodes 191*a* and 191*b*, and the transmittance.

The second pixel electrode 191*b* includes a minute branch electrode 193 extending in a direction facing the first pixel electrode 191*a*. The minute branch electrode 193 is integrally connected to the second pixel electrode 191*b* such that it is applied with the same voltage as the voltage applied to the second pixel electrode 191*b*.

The length $l_1$ of the minute branch electrode 193 may be larger than the width $w_1$ of the second pixel electrode 191*b*.

Also, it is preferable that the length $l_1$ of the minute branch electrode 193 may be smaller than the interval between the first pixel electrode 191*a* and the second pixel electrode 191*b*.

When the length $l_1$ of the minute branch electrode 193 is larger than the interval between the first pixel electrode 191a and the second pixel electrode 191b, the first pixel electrode 191a and the second pixel electrode 191b are shorted. Here, when considering errors generated in a process, it is preferable that the length $l_1$ of the minute branch electrode 193 is less than a value of the width $w_1$ of the second pixel electrode 191b subtracted from the interval between the first pixel electrode 191a and the second pixel electrode 191b.

A plurality of minute branch electrodes 193 may be formed. The plurality of minute branch electrodes 193 may be formed with the same interval and the same width. Here, the interval $s_1$ between the plurality of minute branch electrodes 193 may be larger than or equal to the width $w_2$ of the minute branch electrodes 193.

The dummy electrode 182 and the first pixel electrode 191a are connected to each other, however they have a voltage difference by the second passivation layer 184 formed therebetween. The interval between the dummy electrode 182 and the first pixel electrode 191a and the second pixel electrode 191b, that is, the thickness of the second passivation layer 184, may be set for the voltage difference between the dummy electrode 182 and the first pixel electrode 191a to be more than a threshold voltage Vth of the liquid crystal layer 3. Here, the thickness of the second passivation layer 184 may be more than 1um and less than 3um, and particularly, when the second passivation layer 184 is formed of silicon nitride, it is preferable that the thickness of the second passivation layer 184 is about 2um.

Although not shown, a lower alignment layer is coated on an inner surface of the lower panel 100, and the lower alignment layer may be a vertical alignment layer. A polymer layer may also be disposed on the lower alignment layer, and the polymer layer may include a polymer branch that is formed according to the initial alignment direction of the liquid crystal molecules. The polymer layer may be formed by exposing and polymerizing a prepolymer that is hardened by polymerization with light like ultraviolet rays such as a monomer, and the alignment force of the liquid crystal molecules may be controlled according to the polymer branch.

The upper panel 200 includes a second substrate 210 made of glass or plastic, a light blocking member 220 disposed on the second substrate 210, and a color filter 230.

The light blocking member 220 is disposed at a portion corresponding to between two adjacent pixels and a portion where the first and second thin film transistors TFT1 and TFT2 are disposed, and prevents light leakage from occurring.

The color filters 230 exist within the area surrounded by the light blocking member 220, and may longitudinally extend along the column direction of the plurality of pixel areas. The respective color filters 230, for example, may express one of three primary colors of red, green, and blue, or primary colors of yellow, cyan, and magenta, or a plurality of colors. Also, each pixel may represent a mixture color of the primary colors, or white, as well as the primary colors.

As described above, the color filter 230 and the light blocking member 220 are disposed in the upper panel 200, however at least one of the color filter 230 and the light blocking member 220 may be disposed in the lower panel 100.

An overcoat 250 is disposed on the color filters 230 and the light blocking member 220. The overcoat 250 may be made of an organic insulator, and prevents the color filters 230 from being exposed and provides a planarized surface. The overcoat 250 may be omitted.

Although not shown, an upper alignment layer (not shown) is coated on the inner surface of the display panel 200, and the upper alignment layer may be a vertical alignment layer. A polymer layer may also be disposed on the upper alignment layer, and the polymer layer may include a polymer branch that is formed according to the initial alignment direction of the liquid crystal molecules. The polymer layer may be formed by exposing a prepolymer that is hardened by polymerization with light like ultraviolet rays such as a monomer, such that the alignment force of the liquid crystal molecules may be controlled.

Although not shown, at least one polarizer (not shown) may be provided on the outer surface of the display panels 100 and 200.

The liquid crystal layer 3 that is disposed between the lower display panel 100 and the upper display panel 200 includes liquid crystal molecules 31 that have positive dielectric anisotropicity, and the liquid crystal molecules 31 may be aligned so that long axes thereof are perpendicular to the surfaces of two display panels 100 and 200 in a state in which there is no electric field.

If the first pixel electrode 191a and the second pixel electrode 191b are applied with different voltages, an electric field that is almost parallel to the surfaces of the display panels 100 and 200 is generated. Thus, the liquid crystal molecules of the liquid crystal layer 3 that are initially aligned perpendicular to the surfaces of the display panels 100 and 200 are rearranged in response to the electric field such that the long axes thereof are declined parallel to the direction of the electric field, and the change degree of the polarization of the light incident to the liquid crystal layer 3 is different according to the declination degree of the liquid crystal molecules. The change of the polarization appears as a change of the transmittance by the polarizer, and thereby the liquid crystal display displays the images.

As described above, the liquid crystal molecules 31 that are vertically aligned are used such that the contrast ratio of the liquid crystal display may be improved and a wide viewing angle may be realized. In addition, the liquid crystal molecules 31 that have positive dielectric anisotropicity have greater dielectric anisotropicity and a lower rotation viscosity as compared to the liquid crystal molecules 31 that have negative dielectric anisotropicity, so it is possible to obtain a rapid response speed.

Figure 6:
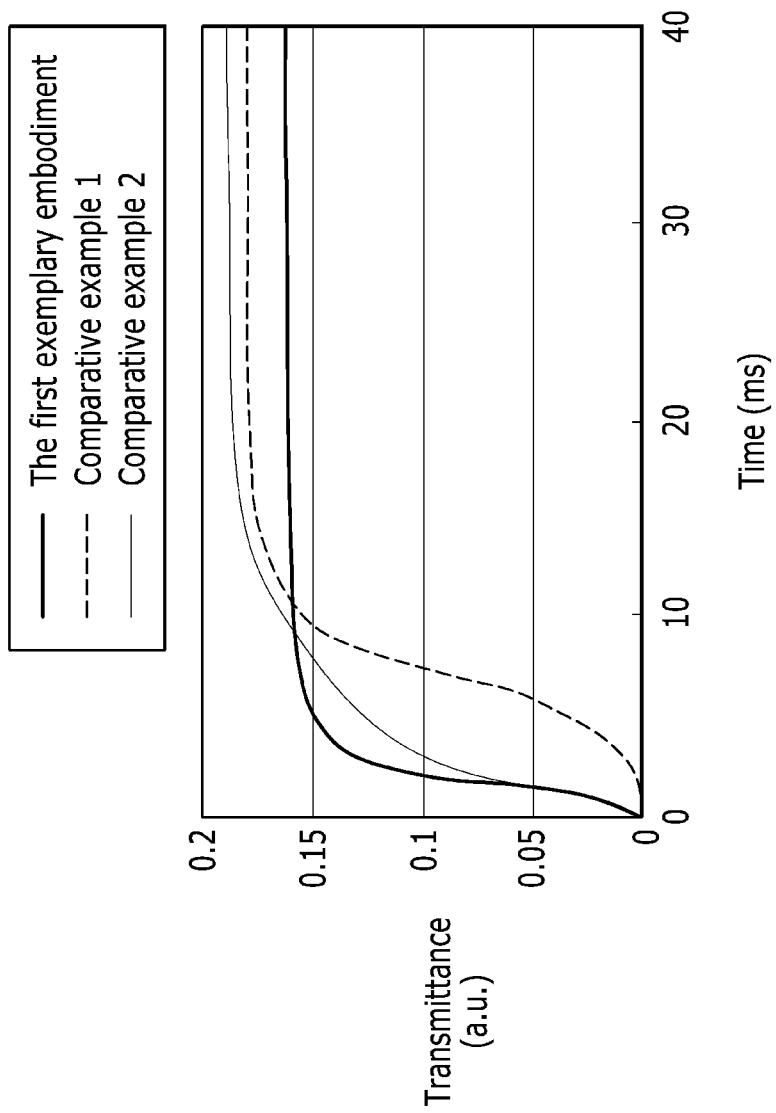
FIG. 6 is a graph showing comparative response time of a liquid crystal for a liquid crystal display according to exemplary embodiments of the present invention.

Next, stability of liquid crystal driving and a response time of a liquid crystal in the liquid crystal display according to exemplary embodiments of the present invention will be described with reference to FIG. 6, compared with a liquid crystal display according to Comparative Example 1.

FIG. 6 is a graph for comparing a response time of a liquid crystal for a liquid crystal display according to exemplary embodiments of the present invention and a liquid crystal display according to Comparative Example 1.

In the liquid crystal display according to Comparative Example 1, the first pixel electrode 191a and the second pixel electrode 191b are formed like an exemplary embodiment of the FIG. 4, however the dummy electrode 182 and the minute branch electrodes 193 are not formed. If the voltage is applied to the first pixel electrode 191a and the second pixel electrode 191b such that the electric field is formed between the two electrodes, the liquid crystal molecules of the liquid crystal layer 3 are sequentially inclined from a position close to the first pixel electrode 191a and the second pixel electrode 191b from a position far from the first pixel electrode 191a and the second pixel electrode 191b in the direction parallel to the electric field. That is, the liquid crystal molecules positioned close to the first pixel electrode 191a and the second pixel electrode 191b are firstly driven, and the liquid crystal molecules positioned at the center between the first pixel electrode 191a and the second pixel electrode 191b are driven later.

Here, the liquid crystal molecules further closer to the first pixel electrode 191a and the liquid crystal molecules further closer to the second pixel electrode 191b are inclined in different directions. Accordingly, the liquid crystal molecules positioned at the center between the first pixel electrode 191a and the second pixel electrode 191b are not inclined in a uniform direction and are unstably driven.

The liquid crystal display according to Comparative Example 2 includes the first pixel electrode 191a, the second pixel electrode 191b, and the dummy electrode 182 like an exemplary embodiment of the FIG. 4, however the minute branch electrodes 193 may not be formed. By forming the dummy electrode 182, the symmetry of the electric field formed between the first pixel electrode 191a and the second pixel electrode 191b is broken, and the liquid crystal molecules positioned between the first pixel electrode 191a and the second pixel electrode 191b are all inclined in the same direction. Accordingly, the liquid crystal molecules positioned at the center between the first pixel electrode 191a and the second pixel electrode 191b are inclined in a uniform direction such that they are stably driven.

Here, the liquid crystal molecules are driven in the sequence of close to the first pixel electrode 191a to far from the first pixel electrode 191a, but are driven in a sequence of close to the second pixel electrode 191b to far from the second pixel electrode 191b. That is, if the liquid crystal molecules positioned close to the first pixel electrode 191a are driven first, the liquid crystal molecules close to the second pixel electrode 191b are driven last. Accordingly, it is assumed that the interval between the first pixel electrode 191a and the second pixel electrode 191b is constant, the response time is increased in the liquid crystal display according to Comparative Example 2 compared with the liquid crystal display according to Comparative Example 1.

However, in the liquid crystal display, for example, the dummy electrode 182 is disposed under the first pixel electrode 191a and the second pixel electrode 191b, and the second pixel electrode 191b includes the minute branch electrodes 193 extending in the direction facing the first pixel electrode 191a. Accordingly, the symmetry of the electric field formed between the first pixel electrode 191a and the second pixel electrode 191b is broken such that the liquid crystal molecules positioned at the center between the first pixel electrode 191a and the second pixel electrode 191b are stably driven.

Also, the second pixel electrode 191b includes the minute branch electrodes 193 such that the minute branch electrodes 193 are applied with the same voltage as the second pixel electrode 191b, and thereby the distance between the first pixel electrode 191a and the second pixel electrode 191b is substantially closer. Accordingly, in the liquid crystal display according to the first exemplary embodiment of the present invention, the response time of the liquid crystal is reduced compared with Comparative Example 1 and Comparative Example 2. Referring to FIG. 6, the response time of the liquid crystal of Comparative Example 1 is 6.95ms and the response time of the liquid crystal of Comparative Example 2 is 10.37ms, however the response time of the liquid crystal in the liquid crystal display according to an exemplary embodiment of FIG. 4 is about 3.71ms.

That is, in the liquid crystal display of FIG. 4, the minute branch electrodes 193 are disposed while maintaining the distance between the first pixel electrode 191a and the second pixel electrode 191b such that the response speed may be improved while minimizing reduction of transmittance. Here, the response speed of the liquid crystal and the transmittance are affected by the length $l_1$ of the minute branch electrodes 193. When the length $l_1$ of the minute branch electrodes 193 is short, the reduction of the transmittance is hardly generated, however the response speed of the liquid crystal is not largely improved. Also, when the length $l_1$ of the minute branch electrodes 193 is long, the response speed of the liquid crystal is largely improved, however the transmittance is relatively further decreased. Accordingly, the length $l_1$ of the minute branch electrodes 193 may be appropriately controlled and designed by considering the desired transmittance and the response speed of the liquid crystal.

Hereinafter, a liquid crystal display of FIG. 7 will be described with reference to accompanying drawings according to exemplary embodiments of the present invention.

Figure 7:
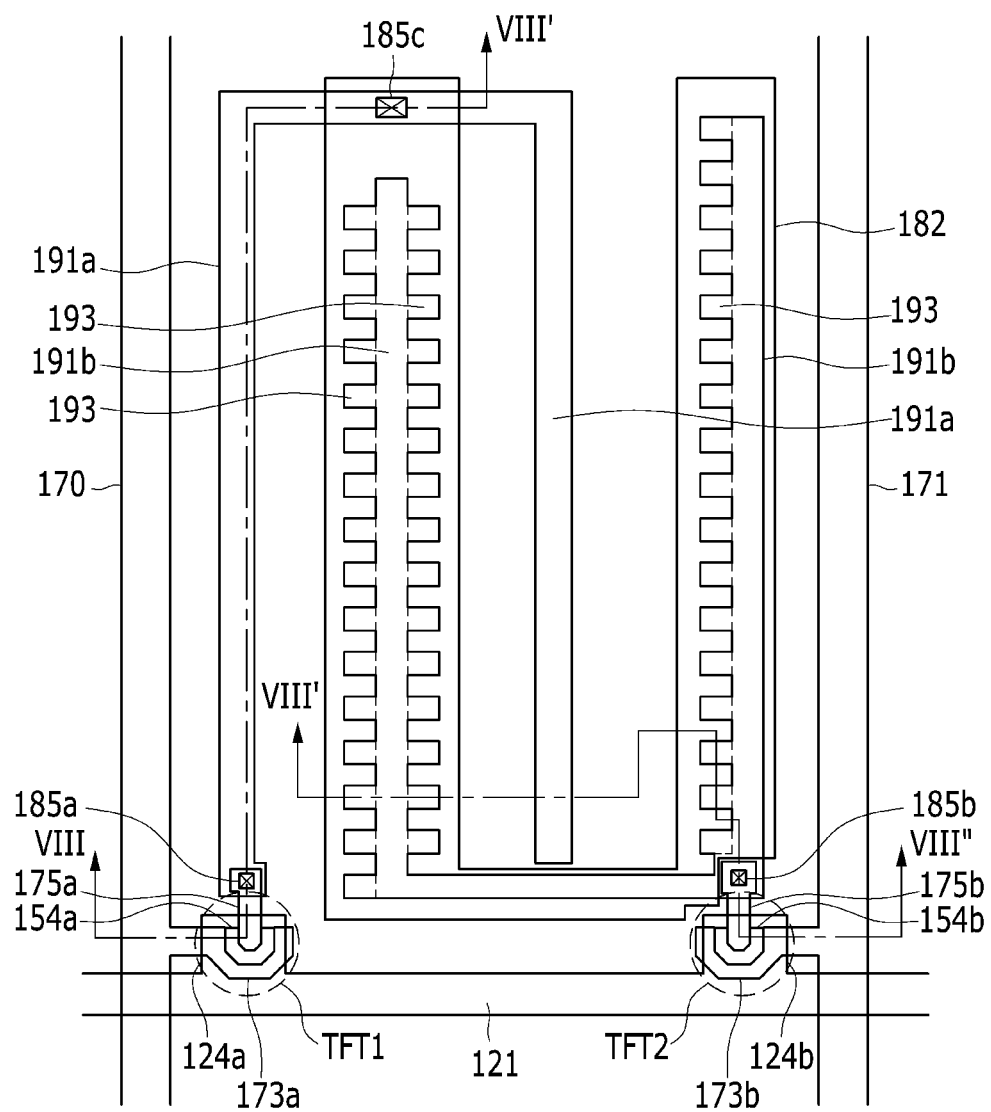
FIG. 7 is a layout view of one pixel of a liquid crystal display according to exemplary embodiments of the present invention.

The liquid crystal display of FIG. 7 is mostly the same as the liquid crystal display of FIG. 4, however is partially different. Here, as the largest difference, the dummy electrode 182 is entirely disposed in one pixel area of FIG. 4, however the dummy electrode 182 is partially disposed in one pixel area of FIG. 7, and this will be described later.

Figure 8:
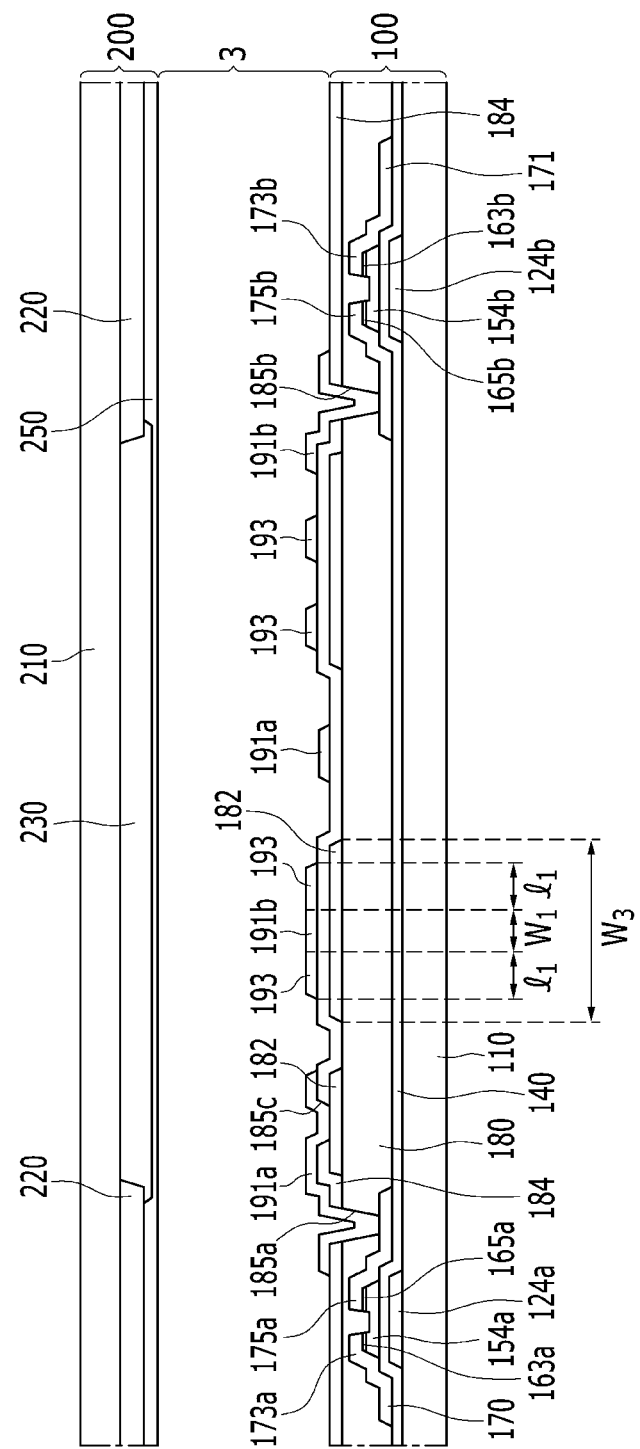
FIG. 8 is a cross-sectional view of one pixel of a liquid crystal display taken along the lines VIII-VIII' and VIII'-VIII" of FIG. 7.

FIG. 7 is a layout view of one pixel of a liquid crystal display according to exemplary embodiments of the present invention, and FIG. 8 is a cross-sectional view of one pixel of a liquid crystal display taken along the lines VIII-VIII' and VIII'-VIII" of FIG. 7.

The liquid crystal display of FIG. 7 includes the lower panel 100 and the upper panel 200, and the liquid crystal layer 3 interposed between the two display panels 100 and 200. The upper panel 200 and the liquid crystal layer 3 are the same as in the FIG. 4 such that the description thereof is omitted to avoid unnecessarily obscuring the present invention, and differences from the liquid crystal display of FIG. 4 among the constituent elements of the lower panel 100 will be described.

The dummy electrode 182 of FIG. 4 is entirely disposed in one pixel area, however the dummy electrode 182 of FIG. 7 is not entirely in the pixel area, but is disposed under the second pixel electrode 191b. The second pixel electrode 191b includes the minute branch electrodes 193 extending in the direction facing the first pixel electrode 191a, and the dummy electrode 182 is also disposed under the minute branch electrodes 193.

The dummy electrode 182 may have a width $w_3$ for overlapping the entire second pixel electrode 191b and the minute branch electrodes 193. For example, in the portion where the minute branch electrodes 193 are disposed to be extended at both sides of the second pixel electrode 191a in FIG. 8, the width $w_3$ of the dummy electrode 182 is larger than the sum of the width $w_1$ of the second pixel electrode 191a and the length $l_1$ of two minute branch electrodes 193.

The dummy electrode 182 overlaps a portion of the first pixel electrode 191a. The second passivation layer 184 has the third contact hole 185c corresponding to a portion overlapping the dummy electrode 182 and the first pixel electrode 191a. The dummy electrode 182 and the first pixel electrode 191a are electrically connected to each other through the third contact hole 185c.

In the liquid crystal display of FIG. 7, the dummy electrode 182 electrically connected to the first pixel electrode 191a is disposed to overlap the second pixel electrode 191b and the minute branch electrodes 193. Accordingly, the symmetry of the electric field formed between the first pixel electrode 191a and the second pixel electrode 191b is broken such that the liquid crystal molecules positioned at the center between the first pixel electrode 191a and the second pixel electrode 191b are stably driven.

Also, the second pixel electrode 191b includes the minute branch electrodes 193 such that the response speed of the liquid crystal may be improved while minimizing the reduction of the transmittance.

Hereinafter, a liquid crystal display according to an exemplary embodiment of the present invention with respect to FIG. 9 will be described with reference to accompanying drawings.

Figure 9:
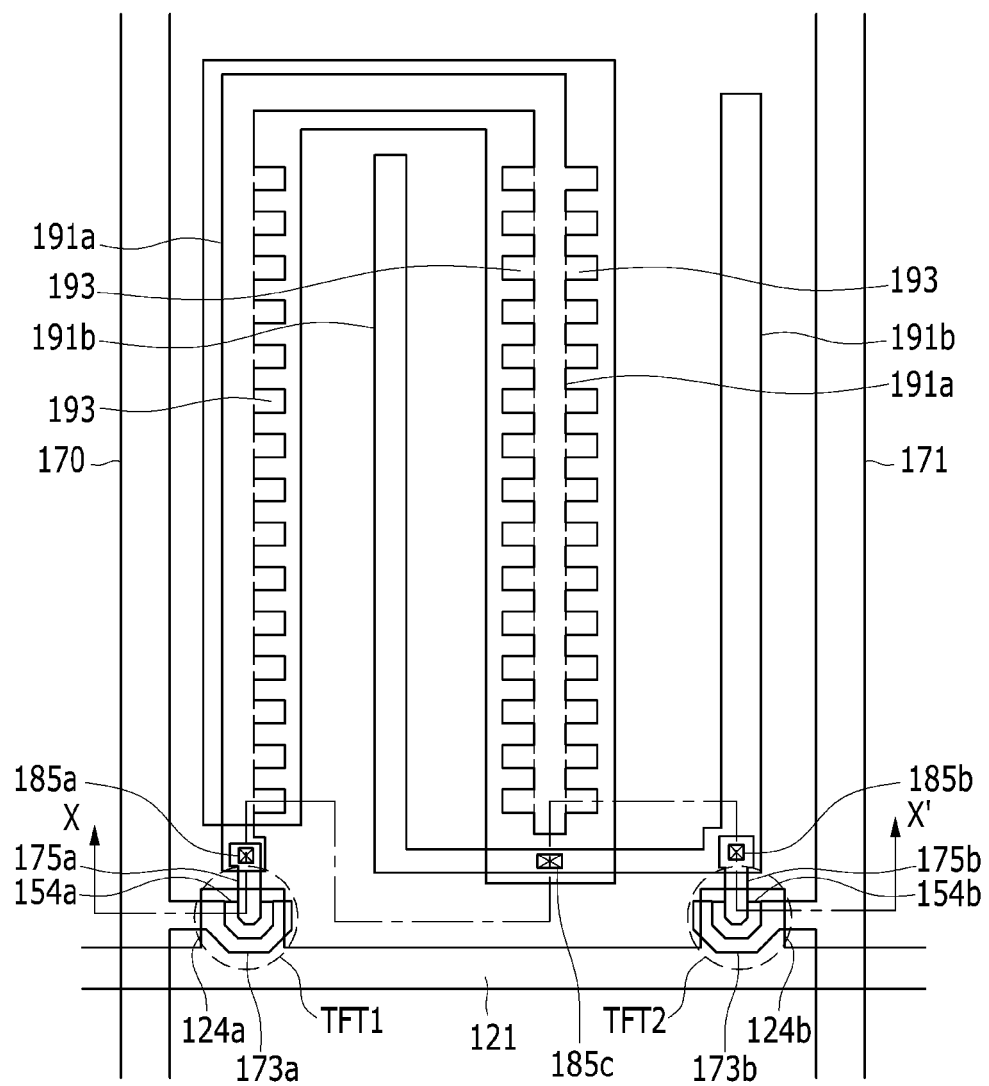
FIG. 9 is a layout view of one pixel of a liquid crystal display according to exemplary embodiments of the present invention.

The liquid crystal display of FIG. 9 is mostly the same as the liquid crystal display of FIG. 7, however is partially different. Here, as the largest difference, the dummy electrode 182 is connected to the first pixel electrode 191a in FIG. 7, however the dummy electrode 182 is connected to the second pixel electrode 191b in the third exemplary embodiment, and this will be described later.

Figure 10:
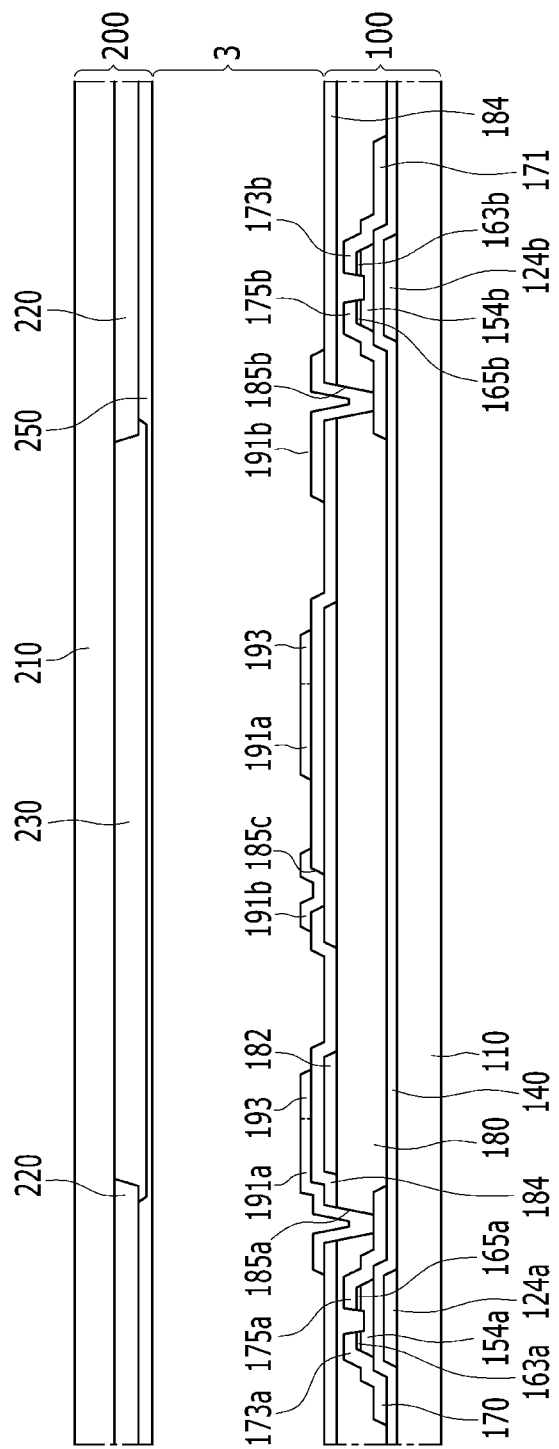
FIG. 10 is a cross-sectional view of one pixel of a liquid crystal display taken along the line X-X' of FIG. 9.

FIG. 9 is a layout view of one pixel of a liquid crystal display according to exemplary embodiments of the present invention, and FIG. 10 is a cross-sectional view of one pixel of a liquid crystal display taken along the line X-X' of FIG. 9.

The liquid crystal display of FIG. 9 may include the lower panel 100 and the upper panel 200 facing each other, and the liquid crystal layer 3 interposed between the two display panels 100 and 200. The upper panel 200 and the liquid crystal layer 3 are the same as in the FIG. 7 such that the description thereof is omitted to avoid unnecessarily obscuring the present invention, and differences from the liquid crystal display of FIG. 7 among the constituent elements of the lower panel 100 will be described.

The dummy electrode 182 is mostly disposed under the second pixel electrode 191b of FIG. 7, however the dummy electrode 182 is mostly disposed under the first pixel electrode 191a in FIG. 9.

The first pixel electrode 191a includes the minute branch electrodes 193 extending in the direction facing the second pixel electrode 191b. The minute branch electrodes 193 are integrally connected to the first pixel electrode 191a thereby being applied with the same voltage as the voltage applied to the first pixel electrode 191a. The dummy electrode 182 is also disposed under the minute branch electrodes 193.

The length of the minute branch electrodes 193 may be larger than the width of the first pixel electrode 191a.

Also, it is contemplated that the length of the minute branch electrodes 193 is smaller than the interval between the first pixel electrode 191a and the second pixel electrode 191b. When the length of the minute branch electrodes 193 is larger than the interval between the first pixel electrode 191a and the second pixel electrode 191b, the first pixel electrode 191a and the second pixel electrode 191b may be shorted. Here, when considering errors generated in the process, it is noted that the length of the minute branch electrodes 193 is less than a value of the width of the first pixel electrode 191a subtracted from the interval between the first pixel electrode 191a and the second pixel electrode 191b.

The width of the dummy electrode 182 may be disposed to overlap the first pixel electrode 191a and all the minute branch electrodes 193.

The dummy electrode 182 overlaps a portion of the second pixel electrode 191b. The second passivation layer 184 has the third contact hole 185c corresponding to a portion overlapping the dummy electrode 182 and the second pixel electrode 191b. The dummy electrode 182 and the second pixel electrode 191b are electrically connected to each other through the third contact hole 185c.

In the liquid crystal display of FIG. 9, the dummy electrode 182 that is electrically connected to the second pixel electrode 191b is disposed to overlap the first pixel electrode 191a and the minute branch electrodes 193. Accordingly, the symmetry of the electric field formed between the first pixel electrode 191a and the second pixel electrode 191b is broken such that the liquid crystal molecules positioned at the center between the first pixel electrode 191a and the second pixel electrode 191b can stably be driven.

Also, the first pixel electrode 191a includes the minute branch electrodes 193 such that the response speed of the liquid crystal may be improved while minimizing the reduction of the transmittance.

Hereinafter, a liquid crystal display according to exemplary embodiments of the present invention with respect to FIG. 11 will be described with reference to accompanying drawings.

Figure 11:
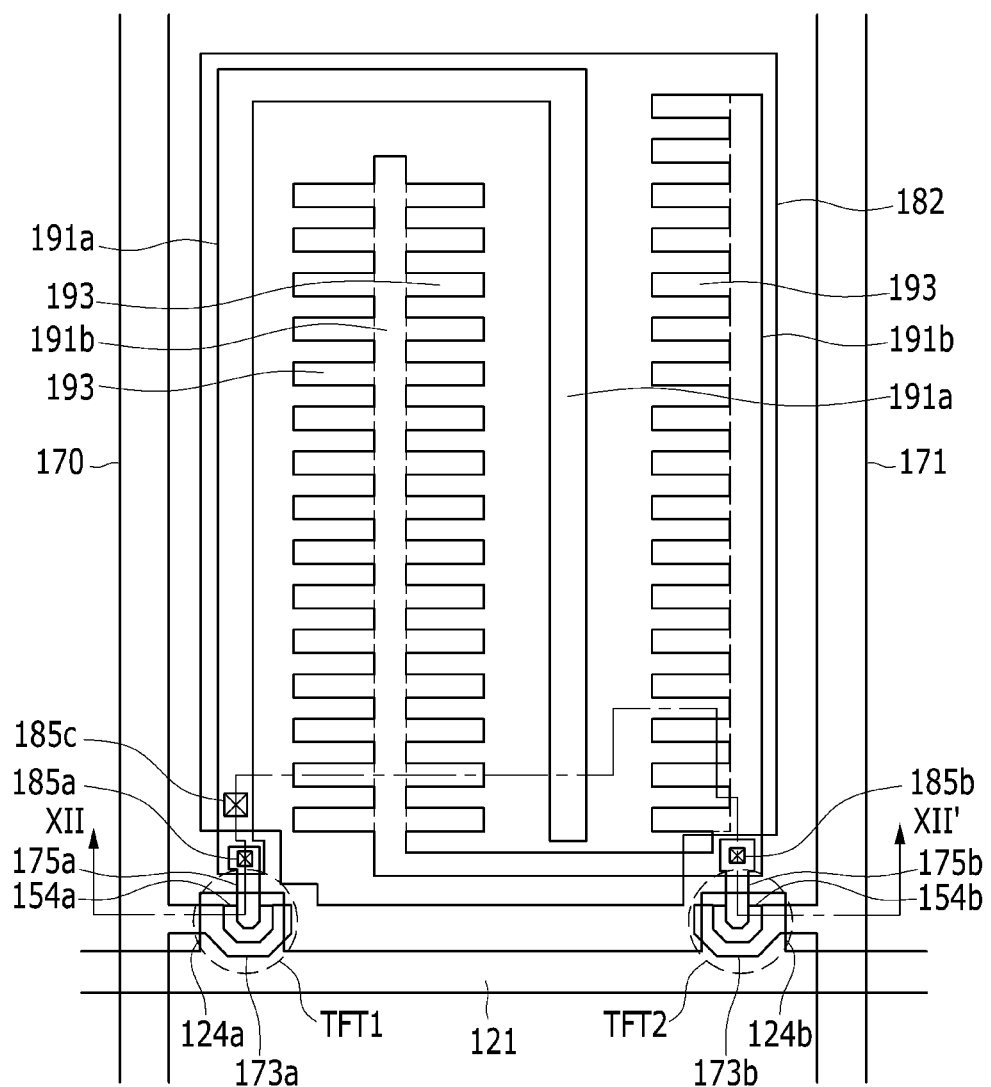
FIG. 11 is a layout view of one pixel of a liquid crystal display according to exemplary embodiments of the present invention.

The liquid crystal display of FIG. 11 is mostly the same as the liquid crystal display of FIG. 4, however it is partially different. Here, as the largest difference, the first pixel electrode 191a and the second pixel electrode 191b are formed with the same layer in the first exemplary embodiment, however the first pixel electrode 191a and the second pixel electrode 191b are formed with different layers in the fourth exemplary embodiment.

Figure 12:
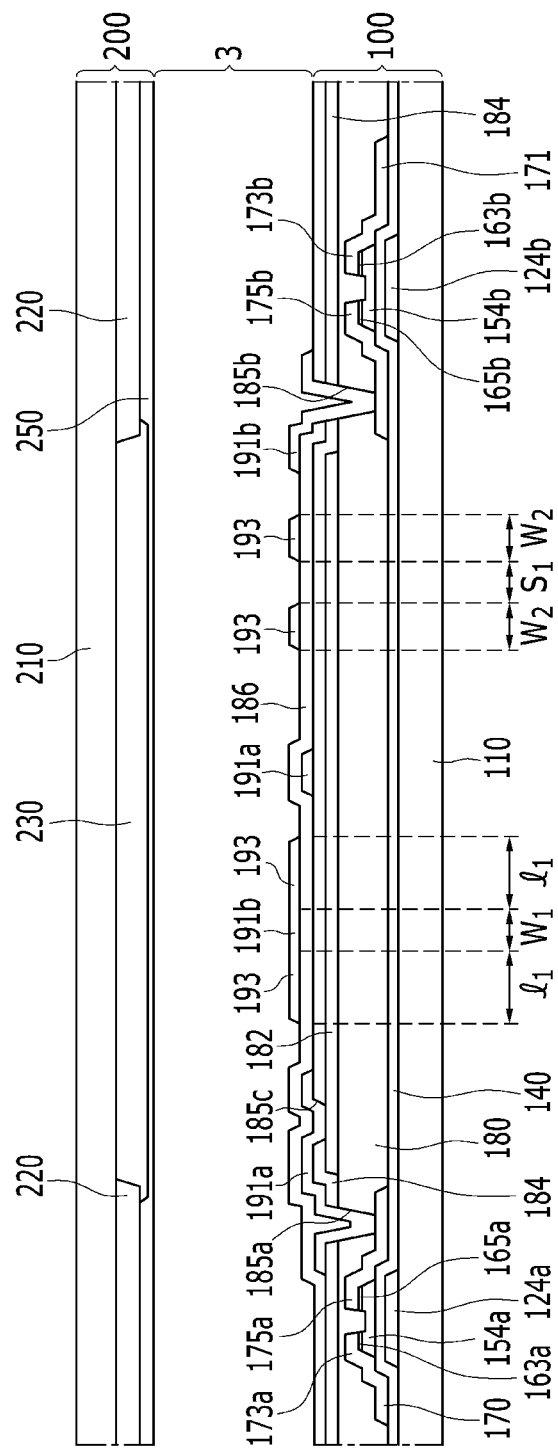
FIG. 12 is a cross-sectional view of one pixel of a liquid crystal display taken along the line XII-XII' of FIG. 11.

FIG. 11 is a layout view of one pixel of a liquid crystal display of FIG. 11, and FIG. 12 is a cross-sectional view of one pixel of a liquid crystal display taken along the line XII-XII' of FIG. 9.

The liquid crystal display of FIG. 11 includes the lower panel 100 and the upper panel 200 facing each other, and the liquid crystal layer 3 interposed between the two display panels 100 and 200. The upper panel 200 and the liquid crystal layer 3 are the same as in the FIG. 4 such that the description thereof is omitted to avoid unnecessarily obscuring the present invention, and differences from the liquid crystal display of FIG. 4 among the constituent elements of the lower panel 100 will be described.

The first passivation layer 180 and the second passivation layer 184 have the first contact hole 185a exposing a portion of the first drain electrode 175a, and the second passivation layer 184 has the third contact hole 185c exposing a portion of the dummy electrode 182.

The first pixel electrode 191a connected to the first drain electrode 175a through the first contact hole 185a is disposed on the second passivation layer 184. The first pixel electrode 191a is connected to the dummy electrode 182 through the third contact hole 185c.

A third passivation layer 186 is disposed on the whole surface of the first substrate 110 including the first pixel electrode 191a. The third passivation layer 186 may be made of an inorganic insulating material or an organic insulating material. The first passivation layer 180, the second passivation layer 184, and the third passivation layer 186 have the second contact hole 185b exposing the portion of the second drain electrode 175b.

The second pixel electrode 191b connected to the second drain electrode 175b through the second contact hole 185b is disposed on the third passivation layer 186.

The second pixel electrode 191b includes a minute branch electrodes 193 extending in the direction facing the first pixel electrode 191a.

The length $l_1$ of the minute branch electrodes 193 may be larger than the width $w_1$ of the second pixel electrode 191b.

Also, the length $l_1$ of the minute branch electrodes 193 may be smaller than the interval between the first pixel electrode 191a and the second pixel electrode 191b. However, differently from the first exemplary embodiment, although the length $l_1$ of the minute branch electrodes 193 is larger than the interval between the first pixel electrode 191a and the second pixel electrode 191b, the first pixel electrode 191a and the second pixel electrode 191b are not short-circuited. That is because, while the first pixel electrode 191a and the second pixel electrode 191b are formed with the same layer in the first exemplary embodiment, the first pixel electrode 191a and the second pixel electrode 191b are formed with different layers in the fourth exemplary embodiment and the third passivation layer 186 is formed between the two electrodes. Accordingly, the length $l_1$ of the minute branch electrodes 193 may be larger than the interval between the first pixel electrode 191a and the second pixel electrode 191b.

In the exemplary embodiments, the structure in which one of the first pixel electrode and the second pixel electrode has the minute branch electrodes is described. However, the present invention is not limited thereto, and the first pixel electrode and the second pixel electrode may both have the minute branch electrodes, and in this case, the same effect as the above-described exemplary embodiments may be expected.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus comprising:
a substrate;
a first pixel electrode and a second pixel electrode disposed to face each other on the substrate;
a branch electrode extending from one of the first pixel electrode and the second pixel electrode; and
a dummy electrode disposed under the first pixel electrode, the second pixel electrode, or both the first pixel electrode and the second pixel electrode,
wherein the other of the first pixel electrode and the second pixel electrode is free of any branch electrode, and
wherein the dummy electrode is electrically connected to the first pixel electrode or the second pixel electrode.

2. The apparatus of claim 1, wherein
the substrate comprises a plurality of pixel areas,
a plurality of the first pixel electrodes and the second pixel electrodes are disposed in the pixel areas, the first pixel electrode and the second pixel electrode are alternately disposed, and
the dummy electrode is disposed in the plurality of pixel areas.

3. The apparatus of claim 1, wherein the branch electrode extends from the first pixel electrode, and the dummy electrode is disposed under the first pixel electrode.

4. The apparatus of claim 3, wherein
the dummy electrode is disposed to overlap the first pixel electrode and the branch electrode.

5. The apparatus of claim 1, further comprising:
a gate line disposed on the substrate and configured to transmit a gate signal;
a voltage transmitting line disposed on the substrate and configured to transmit a predetermined voltage;
a data line disposed on the substrate and configured to transmit a data signal;
a first thin film transistor connected to the gate line and the voltage transmitting line; and
a second thin film transistor connected to the gate line and the data line,
wherein the first pixel electrode is connected to the first thin film transistor, and
the second pixel electrode is connected to the second thin film transistor.

6. The apparatus of claim 5, further comprising:
an insulating layer disposed between the dummy electrode and the first and second pixel electrodes.

7. The apparatus of claim 6, wherein
the insulating layer comprises a contact hole exposing the dummy electrode, and
the first pixel electrode is connected to the dummy electrode through the contact hole.

8. The apparatus of claim 7, wherein
the dummy electrode is disposed under the second pixel electrode,
the branch electrode extends from the second pixel electrode, and
the dummy electrode is disposed to overlap the second pixel electrode and the branch electrode.

9. The apparatus of claim 6, wherein
the insulating layer has a contact hole exposing the dummy electrode, and
the second pixel electrode is connected to the dummy electrode through the contact hole.

10. The apparatus of claim 9, wherein
the dummy electrode is disposed under the first pixel electrode,
the branch electrode extends from the first pixel electrode, and
the dummy electrode is disposed to overlap the first pixel electrode and the branch electrode.

11. The apparatus of claim 6, wherein
the thickness of the insulating layer is more than about pm and less than about $3\mu m$.

12. The apparatus of claim 11, wherein
the insulating layer comprises silicon nitride, and
the thickness of the insulating layer is about $2\mu m$.

13. The apparatus of claim 1, wherein
the branch electrode extends from the first pixel electrode in a direction facing the second pixel electrode, and
the length of the branch electrode is larger than the width of the first pixel electrode and is smaller than the interval between the first pixel electrode and the second pixel electrode.

14. The apparatus of claim 13, wherein
a plurality of branch electrodes are formed, and
the interval between the branch electrodes is equal to or larger than the width of the branch electrode.

15. The apparatus of claim 1, wherein
the first pixel electrode and the second pixel electrode are disposed on the same layer.

16. The apparatus of claim 1, wherein the first pixel electrode and the second pixel electrode are disposed on different layers.

17. The apparatus of claim 15, wherein the length of the branch electrode is less than a value of the width of the second pixel electrode subtracted from the interval between the first pixel electrode and the second pixel electrode.

18. The apparatus of claim 16, wherein the length of the branch electrode is smaller than the interval between the first pixel electrode and the second pixel electrode or larger than the interval between the first pixel electrode and the second pixel electrode.

19. The apparatus of claim 7, wherein:
the contact hole comprises a first contact hole, a second contact hole, and a third contact hole;
the first pixel electrode is connected to a first drain electrode through the first contact hole;

the second pixel electrode is connected to a second drain electrode through the second contact hole; and the first pixel electrode is connected to the dummy electrode through the third contact hole.

20. A liquid crystal display comprising:

a first substrate and a second substrate facing each other;

a gate line disposed on the first substrate;

a voltage transmitting line disposed on the first substrate;

a data line disposed on the first substrate and configured to transmit a data signal;

a first thin film transistor connected to the gate line and the voltage transmitting line;

a second thin film transistor connected to the gate line and the data line;

a first pixel electrode connected to the first thin film transistor;

a second pixel electrode connected to the second thin film transistor and facing the first pixel electrode;

a branch electrode extending from one of the first pixel electrode and the second pixel electrode;

a liquid crystal layer disposed between the first substrate and the second substrate, having positive dielectric anisotropy, and being aligned vertically; and a dummy electrode disposed under the first pixel electrode, the second pixel electrode, or both the first pixel electrode and the second pixel electrode, wherein the other of the first pixel electrode and the second pixel electrode is free of any branch electrode, and wherein the dummy electrode is electrically connected to the first pixel electrode or the second pixel electrode.

21. The liquid crystal display of claim 20, further comprising:

an insulating layer disposed between the dummy electrode and the first and second pixel electrodes, wherein the insulating layer comprises a contact hole exposing the dummy electrode, and the first pixel electrode or the second pixel electrode is connected to the dummy electrode through the contact hole.

* * * * *